United States Patent [19]

Trulsson et al.

[11] 3,804,639

[45] Apr. 16, 1974

[54] COATING COMPOSITION HAVING POLYMERIC SILOXANE BINDER AND DISPERSED FILLER

[75] Inventors: Nils Olof Trulsson, New Orleans; Dickens Mario Lagos, Gretna, both of La.

[73] Assignee: Standard Paint & Varnish Company, Harvey, La.

[22] Filed: Oct. 3, 1972

[21] Appl. No.: 294,648

Related U.S. Application Data

[63] Continuation-in-part of Ser. No. 54,638, July 13, 1970, abandoned.

[52] U.S. Cl. ................ 106/1, 106/14, 106/287 SE, 117/131, 117/135.1, 260/448.8 A
[51] Int. Cl. ................................................ C09d 5/10
[58] Field of Search ......... 260/46.5 R, 2 S, 448.8 A; 106/1, 14, 287 SE; 117/135.1, 131, 160

[56] References Cited
UNITED STATES PATENTS

| | | | |
|---|---|---|---|
| 2,478,390 | 8/1949 | Hanford et al. | 260/2 S |
| 2,507,422 | 5/1950 | Rust et al. | 260/2 S |
| 2,625,520 | 1/1953 | Rust et al. | 260/2 S |
| 3,392,036 | 7/1968 | McLeod | 106/1 |
| 3,392,130 | 7/1968 | Rucker | 106/14 |

*Primary Examiner*—Lorenzo B. Hayes
*Attorney, Agent, or Firm*—Bacon and Thomas

[57] ABSTRACT

A polymeric siloxane binder composition which is the product obtained by polymerizing or condensing a tetraalkyl or tetraalkoxyalkyl orthosilicate in a hydroxylic solvent in the presence of a peroxide and a catalytic amount of a strong acid, solvolysis frequently occurring. There is preferably added a minor amount of an ester of a mineral acid and added water may be present during the formation of the product in an amount up to 90 percent of that required to effect complete hydrolysis of the product. The composition can be used to produce coating compositions of general application by admixture with an appropriate filler, and it is particularly suited for the preparation of an anti-corrosion primer composition for protection of ferrous metal surfaces, when admixed with metallic zinc powder.

24 Claims, No Drawings

COATING COMPOSITION HAVING POLYMERIC SILOXANE BINDER AND DISPERSED FILLER

This application is a continuation-in-part of copending application, Ser. No. 54,638, filed July 13, 1970 and now abandoned.

The present invention relates to a new and improved liquid polymeric siloxane binder composition of high stability which will not gel even when stored for prolonged periods of time, but which will completely cure after application of a coating composition containing it without entire dependence upon atmospheric moisture.

Most of the known binder compositions based on tetraalkyl orthosilicates, such as that based on tetraethyl orthosilicate and used in the manufacture of powdered zinc-containing paints for protecting ferrous metal surfaces by selective galvanic action, depend on moisture absorbed from the atmosphere to effect cure after application. They are prepared by simultaneous partial hydrolysis and condensation upon the addition of 75–90 percent of the amount of water which would effect complete hydrolysis. A lower degree of hydrolysis produces binders which do not cure at an acceptable rate, and a higher degree of hydrolysis produces binders of too limited shelf life.

Since these known binder compositions depend exclusively on adsorption of atmospheric moisture for final cure, applied primer coatings containing them must be rather porous in nature and overcoatings must not be applied until this final cure has been reached which requires a matter of hours at best. When the humidity is low, this can take many hours or even days. After cure and before overcoating, a special mist coat treatment is needed to fill the pores and prevent pin hole formation in the top coat due to solvent or air entrapment in the primer.

In the field, the worker will often apply a top or finish coat to a set but incompletely cured primer coat. This can be disastrous because the green primer is soluble in the solvents of the top coating and deficiencies in cohesion of the primer would result.

Another disadvantage of the prior art partially hydrolyzed ethyl silicate binders is that premature gelling will rapidly occur if water in an amount capable of effecting complete hydrolysis becomes mixed with it prior to application. It is well known that present coating compositions containing 80–85 percent hydrolyzed ethyl silicates will form a gel and be rendered useless within minutes, if excess water is added by accident, for example condensation water from a compressor.

Moreover, not only are the above-described prior binder compositions quickly destroyed by the addition of water, but they also cannot readily be coreacted or modified with a number of other substances which impart desired properties, such as improved flexibility, adhesion, durability, gloss, resistance to mildew, algae, and marine growths, etc., to make the compositions suitable for particular applications.

It is a primary object of the present invention to provide a liquid polymeric siloxane binder composition of high stability which will not gel even when stored for prolonged periods of time, but which will completely cure after application of a coating composition containing it without entire dependence upon atmospheric moisture.

It is another object of the invention to provide a liquid polymeric siloxane binder composition of such nature that a primer composition containing it can be overcoated with tiecoat shortly after application, even if the binder is still incompletely cured, the binder composition rapidly forming a dense, non-porous coating which is not penetrated by the vehicle of most top coatings.

Yet another object of the invention is to provide a liquid polysiloxane binder which is sufficiently versatile in nature to permit field modifications to accommodate specific requirements of application and use.

A further object of the invention is to provide a liquid polymeric siloxane binder composition which will not gel rapidly if an excess of water is added prior to application, and which addition may in fact be desirable.

Yet another object of the invention is to provide a liquid polymeric siloxane binder composition which is particularly advantageous for the preparation of a primer composition for the protection of ferrous surfaces which does not depend entirely on galvanic action even though a metal, such as zinc is used.

Other and further objects of the invention will become apparent from the following detailed description.

It has been found that the above objects can be achieved and a polysiloxane binder which does not depend entirely on hydrolysis by atmospheric moisture for curing can be prepared by polymerizing and/or condensing an alkyl or alkoxyalkyl silicate in the presence of a peroxide and a catalytic amount of a strong acid. The alkyl silicate may be a tetraalkyl orthosilicate, the alkyl groups of which contain from 2–8, preferably two to four, carbon atoms, with tetraethyl orthosilicate being expecially preferred. The alkoxyalkyl silicate may be a tetraalkoxyalkyl orthosilicate in which the alkoxyalkyl group is one derived from a glycol monoether having three to seven carbon atoms, preferably three or four carbon atoms in the molecule. The preferred ester of this type is tetraethoxyethyl orthosilicate which is derived from the monoethyl ether of ethylene glycol commonly referred to by the trade name ethyl cellosolve.

The starting alkyl silicate may also be the economical and readily available materials known as "condensed ethyl silicate" and "ethyl silicate 40." Condensed ethyl silicate is largely tetraethyl orthosilicate but it contains some ethoxy-substituted polysiloxanes. Ethyl silicate. 40 is largely a mixture of ethoxy-polysiloxanes having an average of five silicon atoms in the molecule but it also contains a small amount of tetraethyl orthosilicate.

As was pointed out above in the case of the tetraalkyl orthosilicates, the starting tetraalkoxyalkyl orthosilicates need not be in monomeric form but may be partially condensed. Accordingly, it is to be understood that the naming of the silicate starting material in the annexed claims is intended to include its partially condensed form.

The acid used as the catalyst may be any strong acid which exerts the desired catalytic effect and suitable acids may readily be selected by routine experimentation. An example of a suitable strong organic acid is p-toluenesulfonic acid, and suitable mineral acids are sulfuric and hydrochloric acids. The catalysts preferred for use in the condensation are sulfuric and hydrochloric acids. The amount of strong acid which is present during condensation is not critical and the optimum for a particular condensation reaction can readily be determined by one skilled in the art. In general the catalytic amount of acid present will result in a final binder composition having a pH within the range of 1 to 3.5, as determined with HYDRION test paper manufactured by Micro Essential Laboratory, Brooklyn, New York.

The peroxide, which cannot be a metallic peroxide which would cause precipitation, can be any peroxide which is compatible with the reaction medium and effective at the temperature at which the polymerization is being carried out and suitable peroxides can be quite varied in nature but each type produces slight differences in the properties of the final binder. The peroxide may be hydrogen peroxide or it may be any one of a number of organic peroxides. Examples of organic peroxides suitable for preparing the products according to the invention are as follows:

2, 5 - dimethyl - 2, 5 - bis (2-ethyl hexanoylperoxy) hexane
t-butyl peroxyoctoate
benzoyl peroxide
t-butyl peroxyisopropyl carbonate
t-butyl peroxybenzoate
n-butyl - 4,4- bis (t-butyl peroxy) valerate
2, 5 - dimethyl - 2,5-bis (t-butylperoxy) hexane
di-t-butyl peroxide
acetyl peroxide
t-butyl hydroperoxide
t-butyl peroxyacetate
2,4-dichlorobenzoyl peroxide
dibenzyl peroxydicarbonate
succinic acid peroxide
t-butyl peroxy maleic acid
2,5-dimethyl-2,5-bis-(hydroperoxy) hexane
peracetic acid
cumene hydroperoxide
lauroyl peroxide
methyl ethyl ketone peroxide are all suitable for use in the condensation reaction. Benzoyl peroxide, t-butyl peroxyisopropyl carbonate and t-butyl peroxybenzoate have been found to be particularly suitable.

The peroxide is capable of acting in two different ways, firstly, simply as a catalyst and secondly not only as a catalyst but also as an actual reactant, it is believed by a free radical mechanism, so as to modify the final binder. If it is to be used purely as a catalyst, it should generally be present in a smaller amount, and if it is also to be a modifying reactant, it should generally be present in a larger amount. It is to be understood that the amounts effective for both types of activity will vary in accordance with the particular peroxide being employed, and the activity of a particular peroxide can readily be determined by routine experimentation. In general, it has been found that the amount of peroxide for purely catalytic activity will range between about 0.1 percent to 5 percent by weight based on the silicon content of the binder composition expressed as $SiO_2$, and that the amount of peroxide when it is to function also as a modifier will range between about 1 percent to 65 percent by weight on this same basis. For mere catalytic action a preferred range is from 0.5 percent to 2 percent and when a modifying action is also to be exerted, a range of 5 percent to 25 percent.

There will be presented later tables based on carefully controlled experiments illustrating the type, amount and mode of use of the peroxide.

Of course, when hydrogen peroxide is being employed, one is concerned only with catalytic activity, and it has been found that preferably it should be present in the range of 1 percent to 5 percent.

The larger the amount of peroxide used, the more the resulting binder takes on the character of a purely organic binder, decreasing in its ability to become hydrolyzed. Such highly organic binders are quite suitable for certain applications, but are not as desirable for the formulation of zinc-containing primers. One skilled in the art can readily determine the appropriate amount of peroxide for a particular condensation having in mind the use to which a particular product is to be put.

The rate and quality of the final cure after the polymeric siloxane binder composition has been mixed with the filler and applied will depend on the amount and type of peroxide used.

The condensation reaction must be carried out in a hydroxylic solvent present in an amount sufficient to prevent precipitation of the condensation product. Lower alkanols and monoalkyl ethers of glycols are preferred as solvents, and these may conveniently be the same as the hydroxyl compound from which the starting orthosilicate is derived. The preferred solvents are ethyl alcohol and the monoethyl ether of ethylene glycol (ethyl cellosolve).

Because of the strong acid present, solvolysis occurs rapidly to reach an equilibrium caused by the exchange of the alkoxy or alkoxyalkoxy group of the hydroxylic solvent for one or more of the alkoxy or alkoxyalkoxy groups of the starting esters of silicic or polysilicic acids. This means, of course, that the silicate entering into the reaction to form the product according to the invention will seldom be exclusively the starting ester or polymer, this being true only when the aliphatic groups of the starting material and solvent are the same.

It may be advantageous, in order to obtain a system of higher flash point, to distill off a lower boiling hydroxylic compound as it is formed. This would also have the effect of causing solvolysis to proceed further. The solvolysis which will occur can be followed closely, if desired, by gas-liquid chromatography carried out on aliquot samples at regular intervals.

The solvolysis reaction will obviously occur simultaneously with the other reactions taking place. If water is added at the outset, hydrolysis and condensation will be occurring, and it has been found that this proceeds at a faster rate than solvolysis but only slightly faster and there will always be substantial solvolysis taking place.

It will be understood that the selection of a particular solvent must be determined by the properties required of the final coating composition. For example, if the coating composition is to be used in a confined space giving rise to fire or health hazards, a solvent of relatively high flash point, such as the monoethyl ether of ethylene glycol will be used in preference to a lower alcohol, and this same factor will influence the selection of a starting ester, to be condensed, since obviously such compounds as alcohols and ethers can be produced as a result of the condensation. In all cases, the problem of release of volatiles can be alleviated by the presence of water in the binder composition, since, as pointed out earlier, an excess of water can be added to the present compositions prior to their application without causing rapid gelation.

The reaction by which the binder composition of the invention is prepared is carried out in actual plant operation by placing the starting silicate in a Dowtherm heated stainless steel reactor equipped with stirrer and condenser. The appropriate amount of solvent, say 50 percent by weight of the silicate, is added while stirring. This will minimize the chance of precipitation occurring when the acid catalyst is next added. If the silicate is sufficiently diluted, the acid may be added undiluted, slowly but directly to the silicate solution. However, if insufficient solvent is present, the acid should be diluted to 25 percent strength with solvent before being added.

The resulting mixture is stirred until homogeneous, which may take a few minutes, then the appropriate amount of peroxide is added directly or in solution and stirring continued. While the reactions take place at ambient temperatures, it is generally preferred to carry out the reactions at an elevated temperature. As previously mentioned, the reactions may be carried out at a temperature which will permit the distillation of the lower boiling derivatives, such as ethyl alcohol, to produce a binder with a higher flash point. Also the elimination of the ethyl alcohol will produce a binder in which the solvolysis reaction, earlier mentioned, has been carried further.

The reaction to produce the binder can be considered complete when gas chromatographic analysis shows substantial absence of starting silicate and peroxide, and this can normally be accomplished within 2½-3 hours.

The binder composition thus produced is believed to be unique. Certainly, as will be shown later, it is a completely diferent product than the prior art ethyl silicate binders which are prepared by partial hydrolysis of the ester in the presence of an acid but in the absence of a peroxide.

Hydrolysis is not required in the making of the binder composition of the invention in order to produce a useful coating, but, if desired, water may be added up to 85 percent by weight (based on the starting silicate) of the theoretical amount of water required for complete hydrolysis and still obtain a product of acceptable shelf life. The hydrolysis reaction, if employed, is fully compatible with the other reactions occurring, and water may be added at any stage.

The larger the amount of water added, the shorter will be the shelf life of the binder composition, i.e., the time that the binder composition will remain in a liquid usable state on storage. It has been found, and this constitutes a very important feature of the invention, that shelf life can be increased and final cure after application can be accelerated by mixing with the condensed or polymerized product, a minor proportion of an ester of a strong mineral acid. This stabilizing and cureaccelerating ester is preferably a lower alkyl ester. Diethyl sulfate is the ester of particular preference.

The ester of a mineral acid will be added in a minor proportion based on the weight of the starting ester but the amount can vary considerably depending upon its nature, the amount of water present and the final curing time required for the particular application involved. The optimum amount to be added can readily be determined by balancing all of the factors, but, in general, it can be said that there should be present from 1 percent to 5 percent by weight of the ester of a strong mineral acid based on the weight of the starting orthosilicate.

The binder composition of the present invention can be used in the formulation of coating compositions of great versatility by dispersing a filler therein. By the term "filler" is meant finely divided pigments or extenders which are either functional or inert in character or mixtures thereof. The binder compositions of the invention are particularly suited for the preparation of coating compositions for the protection of ferrous surfaces by incorporation of selective galvanic sacrificial metals, such as aluminum, magnesium and zinc, with the latter being preferred. A particularly useful coating composition is one which contains in addition to zinc, a high density extender, such as zirconium silicate, mullite or kyanite. The extender should have an average particle size within the range of 200–325 mesh.

It will be understood that the metals mentioned above will react with the free acid present in the binder composition to effect neutralization with an accompanying decrease in the amount of free metal. Accordingly, this must be taken into consideration when adding the metal so that an appropriate amount will be present in the final cured coating composition. In the making of such coating compositions, the addition of the active metal will always be made in the field just prior to application of the coating composition.

While, as stated earlier, a hydroxylic solvent should be employed in the preparation of the binder composition of the invention, it is to be understood that compatible paint solvents of a conventional nature can be added in the formulation of the coating compositions to adjust the silica content in accordance with the final properties desired. Amongst such solvents, there may be mentioned aliphatic and aromatic hydrocarbons, ketones and esters.

Unlike the prior coating compositions depending on partially hydrolyzed ethyl silicate as the binder and zinc dust as the filler, the pot-life, of the present coating compositions, that is to say the time between formulation and application, will not be rendered unduly short by the addition of water in excess of that required for complete hydrolysis. It is well known, as pointed out earlier, that if excess water is accidentally added to coatings of the prior art containing ethyl silicates which are hydrolyzed to the extent of 80–85 percent of the thereoretical, they will gel and become useless in matter of minutes. It is, in fact, desirable in some applications that excess water up to 100 percent of the amount required for complete hydrolysis be purposely added to coating compositions according to the present invention just prior to application. In fact, in actual practice, it has been found beneficial to add even higher amounts, although care must be exercised that the pot-life does not become too short.

Regardless of whether such excess water is added, applied coating compositions of the invention will proceed to final cure in the complete absence of moisture from the atmosphere, as contrasted with the prior art coatings based on ethyl silicate which are totally dependent on atmospheric moisture for cure.

In the formation of a zinc-rich coating composition for protection of a ferrous surface by sacrificial action, the composition will preferably contain, on a solids basis, from 5–15 percent by weight of the binder solids and from 95–85 percent by weight of a filler component consisting largely of the powdered zinc. There may also be present amounts up to 20 percent or more of the weight of the other finely divided substances, such as the high density extenders mentioned earlier or magnesium silicate, silica, and ordinary pigments, such as iron oxides, chrome oxide, molybdate orange, or phthalocyanine blue or green, to name a few.

In addition to the zinc-rich coatings, just described for which these binders are particularly suitable, it will be appreciated that the present binder compositions provide excellent coating compositions for all manner of uses. The filler component of the coating composition may be composed entirely of an inert substance, such as magnesium silicate (talc). Coating compositions may also be prepared containing substances which impart a particular function to the coating, such as in the formulation of an antifouling paint by the incorporation of an antifouling agent, such as cuprous oxide, etc. The coating compositions, may, of course, be colored or pigmented as desired.

The exact proportion of binder composition and filler component will, of course, depend on particle size as well as the total surface area of the finely divided filler. Generally sufficient binder should be present so that each particle is individually coated with the binder, and the composition, therefore, after application, cures to a dense, nonpourous coating.

Within a short time after application, say from 15 minutes to 2 hours at ordinary temperatures, the coating compositions according to the invention will have set to the extent that a finish or top coat can be applied thereover. The solvents in the top coat will not penetrate the silicate coating to loosen it, and, being nonporous in nature, solvent will not be trapped and the formation of blisters or pin-holes in the finish coat by delayed solvent evaporation is avoided. Since final cure of the silicate coating does not depend on moisture from the atmosphere, the silicate undercoat will proceed to final cure even though overcoating was carried out while the undercoat or primer was in the green (uncured) state.

As stated earlier, controlled experiments were conducted to illustrate the correlation between type and amount of the peroxide to be used in the practice of the invention.

A base solution was prepared from the following ingredients:

| | |
|---|---|
| Ethyl silicate 40 | Grams: 5400 |
| Ethyl cellosolve | Grams: 5880 |
| Sulfuric Acid, Concentrated | Grams: 24 |

The ethyl silicate 40 was placed in a 5 gallon polyethylene container, then 5400 grams of ethyl cellosolve were added and the mixture stirred, while a solution of the sulfuric acid in 480 grams of ethyl cellosolve was added. The resulting solvolysis product was used as the base solution for all of the samples tested.

Two sets of samples were prepared from the base solution. The first set was prepared by adding to 200 grams of the base solution a minor amount, approximately 1 percent by weight in each instance based on the weight of the base solution, of a plurality of different organic peroxides representing randomly chosen examples of those readily available on the market, and it should be understood that the selection is not intended to be limiting of the invention. Each sample was refluxed for an hour. The second set of samples was prepared in an identical manner except that approximately 5 percent of peroxide on the same basis was added in each instance.

2 Grams of Bentone 27, a treated montmorillonite manufactured by National Lead Corporation, were dispersed in 7 grams of xylene and 1 gram of alcohol and the resulting dispersion was added with stirring to 100 grams of each of the samples. There were then added to each of the samples 220 grams of Zinc Dust No. 44. The resulting coating compositions were applied by spraying to sandblasted steel test panels for determination of curing rates and hardness. The time of gelation (pot-life) was observed and recorded for each sample.

The results of the tests carried out on the first set of samples are recorded in a Table I and the results for the second set of samples are set out in Table II, both of which are set forth as follows:

TABLE I

| PEROXIDE | CURING TIME IN HRS. | | PENCIL "H" HARDNESS | | | POT LIFE in Days |
|---|---|---|---|---|---|---|
| | Set to Touch | Dry Hard | After 24 Hrs. | After 48 Hrs. | After 96 Hrs. | |
| Control — No Peroxide | 18 | 72 | 1 | 1 | 4–5 | 28 |
| Acetyl Peroxide | 18 | 72 | 1 | 1 | 7–8 | 30 |
| Di-t-Butyl Peroxide | 18 | 72 | 1 | 1 | 7–8 | 35 |
| t-Butyl Hydroperoxide | 18 | 72 | 1 | 1 | 9 | 29 |
| 2,5 Dimethyl-2,5-Bis-(t-Butylperoxy) Hexane | 18 | 72 | 1 | 1 | 7–8 | 28 |
| t-Butyl Peroxyacetate | 18 | 72 | 1 | 1 | 7–8 | 26 |
| 2,4-Dichlorobenzoyl Peroxide | 4 | 18 | 2–3 | 8 | 9 | 21 |
| Benzoyl Peroxide | 4 | 18 | 2 | 7–8 | 9 | 29 |
| Dibenzyl Peroxydicarbonate | 18 | 72 | 1 | 1 | 7–8 | 35 |
| Succinic Acid Peroxide | 18 | 72 | 1 | 1 | 7–8 | 35 |
| t-Butyl Peroxymaleic Acid | 12 | 40 | 1 | 3–4 | 8–9 | 26 |
| 2,5 Dimethyl-2,5-Bis-(Hydroperoxy) Hexane | 12 | 40 | 1 | 2 | 7–8 | 28 |
| Peracetic Acid 40% | 18 | 36 | 2 | 7 | 9 | 30 |
| Cumene Hydroperoxide | 18 | 72 | 1 | 1 | 7–8 | 28 |
| t-Butyl Peroxybenzoate | 8 | 36 | 2 | 6 | 8–9 | 26 |
| Lauroyl Peroxide | 18 | 72 | 1 | 1 | 7–8 | 36 |
| Methyl Ethyl Ketone Peroxide | 18 | 72 | 1 | 1 | 7–8 | 36 |

TABLE II

| PEROXIDE | CURING TIME IN HRS. | | PENCIL "H" HARDNESS | | | POT LIFE in Days |
|---|---|---|---|---|---|---|
| | Set to Touch | Dry Hard | After 24 Hrs. | After 48 Hrs. | After 96 Hrs. | |
| Control — No Peroxide | 18 | 72 | 1 | 1 | 4–5 | 27 |
| Acetyl Peroxide | 2 | 12 | 7 | 8 | 9 | 23 |
| Di-t-Butyl Peroxide | 18 | 72 | 1 | 1 | 7–8 | 30 |
| t-Butyl Hydroperoxide | 18 | 72 | 1 | 1 | 9 | 14 |
| 2,5 Dimethyl-2,5-Bis-(t-Butylperoxy) Hexane | 18 | 72 | 1 | 1 | 7–8 | 30 |
| t-Butyl Peroxyacetate | 1 ½ | 8 | 8–9 | 8–9 | 8–9 | 18 |
| 2,4-Dichlorobenzoyl Peroxide | 1 | 6 | 8 | 9 | 9 | 23 |
| Benzoyl Peroxide | 1 | 6 | 9 | 9 | 9 | 25 |
| Dibenzyl Peroxydicarbonate | 12 | 36 | 1 | 7 | 9 | 25 |
| Succinic Acid Peroxide | 5 | 15 | 6 | 8 | 9 | 23 |
| t-Butyl Peroxymaleic Acid | 4 | 12 | 9 | 9 | 9 | 26 |
| 2,5 Dimethyl-2,5-Bis-(Hydroperoxy) Hexane | 1 | 8 | 9 | 9 | 9 | 18 |
| Peracetic Acid 40% | ⅛ | 2 | 9 | 9 | 9 | 4 |
| Cumene Hydroperoxide | 18 | 72 | 1 | 1 | 7–8 | 29 |
| t-Butyl Peroxybenzoate | 1 | 6 | 8 | 9 | 9 | 26 |
| Lauroyl Peroxide | 18 | 72 | 1 | 4–5 | 7–8 | 29 |
| Methyl Ethyl Ketone Peroxide | 1 ½ | 8 | 8 | 9 | 9 | 18 |

The results shown in the tables are interpreted as follows:

When the curing rates are compared with the peroxide-free control, it can be seen that they all are effective under proper conditions, although to a widely varying degree. The peroxides tested may be grouped in accordance with chemical structure in the order of their decreasing effect, as follows:

1. Peroxy Acid
    Example: Peracetic Acid
2. Aromatic Diacyl Peroxide
    Examples: Benzoyl Peroxide, 2, 4- Dichlorobenzoyl Peroxide
3. Alkyl Peroxyester
    Examples: t-Butyl Peroxyacetate, t-Butyl Perbenzoate, t-Butyl Peroxy Maleic Acid
4. Aliphatic Diacyl Peroxide
    Examples: Acetyl Peroxide, Lauroyl Peroxide
5. Dibasic Acid Peroxide
    Example: Succinic Acid Peroxide
6. Ketone Peroxide
    Example: Methyl Ethyl Ketone Peroxide
7. Alkyl Hydroperoxide
    Example: t-Butyl Hydroperoxide
8. Aralkyl Hydroperoxide
    Example: Cumene Hydroperoxide
9. Alkyl Peroxide
    Examples: Di-t-Butyl Peroxide, 2,5-Dimethyl-2,5-Bis- (t-Butylperoxy) Hexane The following examples are set forth as illustrative of the invention, but are not to be considered as limiting the same. Example I A binder composition was prepared from the following in parts by weight:

| | |
|---|---|
| Tetraethoxyethyl orthosilicate (40% hydrolyzed and containing 19.1% by weight of SiO$_2$ | 250.00 |
| Ethyl cellosolve (99% pure) | 25.00 |
| Concentrated sulfuric acid (98%) | .25 |
| t-Butyl peroxybenzoate | 10.00 |
| Diethyl sulfate | 6.00 |

The silicate was placed in the reaction vessel and the sulfuric acid was added in solution in 5 parts by weight of the solvent with mixing for about 2 minutes. The t-butyl peroxybenzoate was then added dissolved in 20 parts by weight of the solvent and the reaction mixture was maintained under reflux for 1 hour, at which time there had been produced a liquid binder composition containing no monomeric silicate and only 7 percent of dimers and trimers, the remaining 93 percent being in the form of higher polymers. The reaction mixture was cooled and the diethyl sulfate was added with stirring.

The polysilicate of the liquid binder composition thus produced was 40 percent hydrolyzed and the composition had an SiO$_2$ content of 16.7 percent. The composition had a pH of 2–3. Example II A binder composition was prepared from the following in parts by weight:

| | |
|---|---|
| Tetraethoxyethyl orthosilicate (same as that of Example I) | 750.00 |
| Ethyl cellosolve (99% pure) | 55.00 |
| Concentrated sulfuric acid (98%) | 1.00 |
| Water | 10.00 |
| Hydrogen peroxide (6% in water) | 10.00 |
| Diethyl sulfate | 17.00 |

The silicate was placed in the reaction vessel and then under constant stirring, the water dissolved in 10 parts of the solvent was added at a rate such that a temperature of 125° F was rapidly reached and maintained by applying external heat. The sulfuric acid was added in solution in 5 parts of solvent and the aqueous hydrogen peroxide was added in solution in 40 parts of solvent. After reaction at 125° F for 45 minutes, a product free of monomer and containing less than 0.1 percent of dimers and trimers was produced, and on cooling, the diethyl sulphate was added.

The polysilicate of the resulting binder composition was 58 percent hydrolyzed and the composition had an SiO$_2$ content of 17.30 percent. The composition had a pH of 2–3. Example III A binder composition was prepared from the following in parts by weight:

| | |
|---|---|
| Ethyl silicate 40 | 455.00 |
| Ethyl cellosolve (99% pure) | 485.00 |
| Concentrated sulfuric acid (98%) | 1.00 |

-Continued

| | |
|---|---|
| Water | 10.00 |
| Hydrogen peroxide (6% in water) | 20.00 |
| Diethyl sulfate | 20.00 |

The silicate was placed in the reaction vessel and the sulfuric acid added in solution in 5 parts of solvent, followed by the water dissolved in 10 parts of the solvent. The mixture was stirred and the aqueous hydrogen peroxide was added in solution in 40 parts of solvent. After the mixture was heated and reacted at a temperature of 125°F for 45 minutes, the remaining ethyl cellosolve solvent was added and there was obtained a product free of monomer and containing less than 0.1 percent of dimers and trimers. The reaction mixture was cooled and the diethyl sulfate was added.

The polysilicate of the resulting binder composition was 77 percent hydrolyzed and the composition had an $SiO_2$ content of 18.8 percent. The composition had a pH of 2–3. Example IV A binder composition was prepared from the following in parts by weight:

| | |
|---|---|
| Ethyl silicate | 225.00 |
| Ethyl cellosolve (99% pure) | 245.00 |
| Concentrated sulfuric acid (98%) | 1.00 |
| Hydrogen peroxide (6% in water) | 20.00 |
| Diethyl sulfate | 10.00 |

The silicate was placed in the reaction vessel and the sulfuric acid dissolved in 5 parts of solvent was added with stirring for approximately 2 minutes. The aqueous hydrogen peroxide was then added in solution in 40 parts of solvent and the reaction mixture was refluxed for 1 hour, at which time the 200 parts of remaining solvent were added. The resulting product was free of monomer and contained less than 0.1 percent of dimers and trimers. The reaction mixture was cooled and the diethyl sulfate was added.

The polysilicate of the resulting binder composition was 85 percent hydrolyzed, and the composition had an $SiO_2$ content of 18.6 percent. The composition had a pH of 2. Example V A binder composition was prepared from the following in parts by weight:

| | |
|---|---|
| Ethyl silicate 40 | 225.00 |
| Ethyl cellosolve (99% pure) | 245.00 |
| Concentrated sulfuric acid (98%) | 1.00 |
| t-Butyl peroxybenzoate | 20.00 |
| Diethyl sulfate | 10.00 |

The silicate was placed in the reaction vessel and the sulfuric acid was added in solution in 5 parts of the solvent with mixing for about 2 minutes. The t-butyl peroxybenzoate was then added dissolved in 40 parts of solvent and the reaction mixture was refluxed for 1 hour and 200 parts of solvent added to produce a product free of monomer and containing only 4 percent of dimers and trimers. The reaction mixture was cooled and the diethyl sulfate was added with stirring.

The polysilicate of the resulting composition was 38 percent hydrolyzed and the composition had an $SiO_2$ content of 18.6 percent. The composition had a pH of 2–3. Example VI A binder composition was prepared from the following in parts by weight:

| | |
|---|---|
| Tetraethyl orthosilicate (pure) | 225.00 |
| Ethyl cellosolve (99% pure) | 175.00 |
| Concentrated sulfuric acid (98%) | 1.00 |
| Hydrogen peroxide (6% in water) | 15.00 |
| Diethyl sulfate | 9.00 |

Pure tetraethyl orthosilicate was placed in the reaction vessel. The sulfuric acid dissolved in 5 parts of solvent was added and after stirring for about 2 minutes, the aqueous hydrogen peroxide dissolved in 30 parts of solvent was added. The reaction mixture was refluxed for 3 hours and then diluted with remaining 140 parts of solvent, to produce a product free of monomer and containing only 5 percent of dimers and trimers. After cooling of the reaction mixture, the diethyl sulfate was admixed therewith.

The polysilicate of the resulting binder composition was 36.2 percent hydrolyzed and the composition had an $SiO_2$ content of 15.1 percent. The composition had a pH of 2–3. Example VII A binder composition was prepared from the following in parts by weight:

| | |
|---|---|
| Tetraethyl orthosilicate (pure) | 120.00 |
| Ethyl cellosolve (99% pure) | 450.00 |
| Concentrated sulfuric acid (98%) | 1.00 |
| Water | 21.00 |
| Ethyl silicate 40 | 395.00 |
| Hydrogen peroxide (6% in water) | 21.00 |
| Diethyl sulfate | 15.00 |

To the pure tetraethyl orthosilicate in a reaction vessel under stirring, there was added a mixture of 0.75 parts of concentrated sulfuric acid, 25 parts of solvent and 21 parts of water. The resulting exothermic reaction rapidly raised the temperature to 140°F and this fell to 120°–125°F upon the addition of a mixture of 25 parts solvent, 0.25 parts concentrated sulfuric acid and the aqueous hydrogen peroxide. Upon the addition of the ethyl silicate 40, this approximate temperature was maintained for the duration of the condensation reaction, which was about 45 minutes, and the remaining 400 parts of solvent added. The resulting product was free of monomer and contained less than 0.1 percent of dimers and trimers.

The polysilicate of the binder composition so produced was 75 percent hydrolyzed and the composition had an $SiO_2$ content of 19.3 percent. The composition had a pH of 2–3. Example VIII The procedure of Example VII was repeated, except that 20 parts of t-butyl peroxybenzoate were substituted for the aqueous hydrogen peroxide.

The resulting binder composition had the same $SiO_2$ content (19.3 percent) but the polysilicate was 54.2 percent hydrolyzed. The composition had a pH of 2–3.

In order to evaluate the binder compositions of each of the foregoing examples, they were formulated into coating compositions by mixing with zinc dust and applied to sandblasted steel panels. Additional water was added to the compositions of Example I, V, VI, VII, and VIII, just before application. These experiments and the results obtained are summarized in the following table:

TABLE III

| BINDER No. | AMOUNT OF BINDER g. | WATER g. | ZINC DUST g. | RESULT OBTAINED ADHESION AND HARDNESS |
|---|---|---|---|---|
| I | 125 | 5 | 200 | EXCELLENT |
| II | 125 | — | 200 | EXCELLENT |
| III | 100 | — | 200 | EXCELLENT |
| IV | 100 | — | 200 | EXCELLENT |
| V | 100 | 5 | 200 | GOOD |
| VI | 100 | 5 | 200 | EXCELLENT |
| VII | 125 | 5 | 200 | EXCELLENT |
| VIII | 125 | 5 | 200 | EXCELLENT |

Example IX

Two binder compositions A and B were prepared from the following in parts by weight:

| | A | B |
|---|---|---|
| Ethyl silicate 40 | 225.00 | 225.00 |
| Ethyl cellosolve | 245.00 | 245.00 |
| Concentrated sulfuric acid (98%) | 1.00 | 1.00 |
| t-Butyl peroxybenzoate | 20.00 | 40.00 |

The silicate was placed in the reaction vessel and the sulfuric acid was added in solution in 5 parts of the ethyl cellosolve and mixed for about 2 minutes. The t-butyl peroxybenzoate was then dissolved in 40 parts of solvent and added; the reaction mixture was heated to reflux for 1 hour and 200 parts of ethyl cellosolve were then added to produce a product containing less than 1 percent of monomeric tetraethyl orthosilicate. The reaction mixture was then cooled.

To 100 g. of each of the above binder compositions was added a mixture of the following in parts by weight:

| | |
|---|---|
| Xylene | 7 |
| Bentone No. 27 | 2 |
| Ethyl alcohol | 1 | and mixed until it became homogeneous to form two coating compositions also designated as A and B. Then 220 g. of zinc dust was added and the composition was sprayed on a sand-blasted steel panel. RESULT:

| | A | B |
|---|---|---|
| Set to touch, hrs. | 5 | ½ |
| Dry hard, hrs. | 12 | 6 |
| Pencil Hardness after 24 hrs. | 9H | 9H |
| Adhesion after 24 hrs. | Excellent | Excellent |
| Pot life, hrs. | 48 | 36 | to 110 g. of coating composition A, there was added 10 percent by weight of water. The result was as follows:

| | |
|---|---|
| Set to touch, mins. | 5 |
| Dry hard, hrs. | 2 |
| Pencil hardness after 24 hrs. | 9H |
| Pot life, hrs. | 12 |

Example X

A binder composition was prepared from the following in parts by weight:

| | |
|---|---|
| Ethyl silicate 40 | 455.00 |
| Ethyl cellosolve (99% pure) | 485.00 |
| Concentrated sulfuric acid (98%) | 1.00 |
| Hydrogen peroxide (6%) | 20.00 |
| Diethyl sulfate | 20.00 |

The silicate and ethyl cellosolve were placed in the reaction vessel and the sulfuric acid added in solution in 5 parts of ethyl cellosolve followed by the aqueous hydrogen peroxide dissolved in 40 parts of ethyl cellosolve.

The mixture was heated at a temperature of 85°C for 1 ½ hrs. The product obtained was free of monomer and contained less than 0.1 percent of dimers and trimers. The reaction mixture was cooled and then the diethyl sulfate was added.

One hundred g. of above solution were mixed with 1 ½ g. of finely divided asbestos, which was thoroughly dispersed, and then 200 g. of zinc dust was added. The composition was sprayed on a sand-blasted steel panel. RESULT:

| | |
|---|---|
| Set to touch, hrs. | 1 ½ |
| Dry hard, hrs. | 10 |
| Pencil hardness after 24 hrs. | 8–9 H |
| Pot life, hrs. | 48 |

Example XI

A binder composition was prepared from the following in parts by weight:

| | |
|---|---|
| Tetraethyl orthosilicate (99%) | 455.00 |
| Ethyl cellosolve (99%) | 300.00 |
| Benzoyl peroxide (98%) | 10.00 |
| Concentrated sulfuric acid (98%) | 5.00 |

The tetraethyl orthosilicate and ethyl cellosolve were placed in the reaction vessel and the benzoyl peroxide was added with stirring until it was completely dissolved. Then the concentrated sulfuric acid was added, and stirring was continued for 2 hours. The above binder composition was then added to a mixture of the following in parts by weight:

| | |
|---|---|
| Xylene | 56 |
| Bentone No. 27 | 16 |
| Ethyl alcohol | 8 |

The liquid composition thus produced was 0 percent hydrolyzed and contained 0.59 percent of sulfuric acid and 1.18 percent of peroxide. The composition had a pH of 1–1.5.

One hundred ten parts by weight of the above composition were mixed with 220 parts by weight of zinc dust which were thoroughly dispersed. The resulting coating composition was sprayed on a sand-blasted steel panel. RESULT:

| | |
|---|---|
| Set to touch, hrs. | ¾ |
| Dry hard, hrs. | 8 |
| Pencil hardness after 24 hrs. | 4H |
| Pot life, days | 25 |

Thus, we have described binder compositions and coating compositions prepared therefrom which are of great versatility. Unlike the prior art binders based solely on partially hydrolyzed ethyl silicate, they are compatible with a wide variety of modifiers, such as other polymers and plasticizing agents which adapt them for specific uses to which the prior binders and coating compositions cannot be put.

It is to be emphasized that the binder compositions according to the invention are strictly that. Their function is solely to cement filler particles to provide a dense cohesive and adhesive coating. They are not by themselves capable of forming cohesive and adhesive films, as is a varnish.

Having described our invention, we claim:

1. A coating composition comprising a liquid polymeric siloxane binder composition comprising the product produced by polymerizing or condensing a tetraalkyl or tetraalkoxyalkyl orthosilicate in which the alkyl radical is two to eight C atoms and the alkoxyalkyl radical is derived from a glycol monoether of three to seven atoms in a hydroxylic solvent in an amount sufficient to prevent precipitation of said product in the presence of (a) from 0.1 to 65 percent by weight based on the silicon content of the composition expressed as $SiO_2$ of a peroxide selected from the group consisting of hydrogen peroxide and an organic peroxide compatible with the reaction medium and effective at the temperature at which the polymerization is carried out and (b) a catalytic amount of a strong acid, said polymerization or condensation being carried out to the substantial absence of starting silicate and peroxide in the absence of added water or having had water added thereto in an amount of up to 85 percent by weight of that required to effect complete hydrolysis of said orthosilicate; and a finely divided filler dispersed in said binder composition.

2. A coating composition as claimed in claim 1 in which the starting orthosilicate is a tetraalkyl orthosilicate in which the alkyl radical is of two to four C atoms.

3. A coating composition as claimed in claim 1 in which the starting orthosilicate is a tetraalkoxyalkyl orthosilicate in which the alkoxyalkyl radical is derived from a glycol monoether of three or four C atoms.

4. A coating composition as claimed in claim 1 in which the starting orthosilicate is tetraethyl orthosilicate or a mixture of ethoxy-substituted polysiloxanes having an average of five silicon atoms per molecule.

5. A coating composition as claimed in claim 1 in which the starting orthosilicate is tetraethoxyethyl orthosilicate.

6. A coating composition as claimed in claim 1 in which said solvent is a lower alkanol or a monoalkyl ether of a glycol.

7. A coating composition as claimed in claim 1 in which said solvent is ethyl alcohol.

8. A coating composition as claimed in claim 1 in which said solvent is ethyl cellosolve.

9. A coating composition as claimed in claim 1 in which said peroxide is present in the amount of from 0.5 to 2 percent based on the silicon content of the composition expressed as $SiO_2$.

10. A coating composition as claimed in claim 1 in which said peroxide is present in the amount of from 5 to 25 percent based on the silicon content of the composition expressed as $SiO_2$.

11. A coating composition as claimed in claim 1 in which said peroxide is hydrogen peroxide.

12. A coating composition as claimed in claim 1 in which said peroxide is a member selected from the group consisting of 2,5-dimethyl-2,5-bis(2-ethyl hexanoylperoxy) hexane, t-butyl peroxyoctoate, benzoyl peroxide, t-butyl peroxyisopropyl carbonate, t-butyl peroxybenzoate, n-butyl-4,4-bis(t-butyl peroxy) valerate, 2,5-dimethyl-2,5-bis(t-butylperoxy) hexane, di-t-butyl peroxide, acetyl peroxide, t-butyl hydroperoxide, t-butyl peroxyacetate, 2,4-dichlorobenzoyl peroxide, dibenzyl peroxydicarbonate, succinic acid peroxide, t-butyl peroxy maleic acid, 2,5-dimethyl-2,5-bis-(hydroperoxy) hexane, peracetic acid, cumene hydroperoxide, lauroyl peroxide and methyl ethyl ketone peroxide.

13. A coating composition as claimed in claim 12 in which said peroxide is benzoyl peroxide.

14. A coating composition as claimed in claim 12 in which said peroxide is t-butyl peroxyisopropyl carbonate.

15. A coating composition as claimed in claim 12 in which said peroxide is t-butyl peroxybenzoate.

16. A coating composition as claimed in claim 1 in which said strong acid is sulfuric acid.

17. A coating composition as claimed in claim 1 containing from 1 to 5 percent by weight based on the weight of the starting orthosilicate of a lower alkyl ester of a strong mineral acid.

18. A coating composition as claimed in claim 17 in which said lower alkyl ester is diethyl sulfate.

19. A coating composition as claimed in claim 1 in which said filler comprises a powdered metal selected from the group consisting of aluminum, magnesium and zinc.

20. A coating composition as claimed in claim 19 in which said filler is powdered zinc.

21. A coating composition as claimed in claim 20 which contains on a solids basis from 5–15 percent of binder solids and from 95–85 percent of filler.

22. A coating composition as claimed in claim 21 in which said filler contains up to 20 percent by weight of a high density extender.

23. A coating composition as claimed in claim 22 in which said extender is selected from the group consisting of zirconium silicate, mullite and kyanite.

24. A coating composition as claimed in claim 12 wherein said filler comprises powdered zinc.

* * * * *